United States Patent [19]
Jiang

[11] Patent Number: 5,831,846
[45] Date of Patent: Nov. 3, 1998

[54] DUAL MODE BOOST CONVERTER AND METHOD OF OPERATION THEREOF

[75] Inventor: Yimin Jiang, Plano, Tex.

[73] Assignee: Lucent Technologies Inc., Murray Hill, N.J.

[21] Appl. No.: 916,319

[22] Filed: Aug. 22, 1997

[51] Int. Cl.$^6$ ...................................................... H02M 7/00
[52] U.S. Cl. .......................................... 363/125; 363/143
[58] Field of Search .................................... 323/222, 224, 323/271, 282; 363/44, 84, 123, 124, 125, 126, 143, 59, 60, 61, 62

[56] References Cited

U.S. PATENT DOCUMENTS

| | | | |
|---|---|---|---|
| 3,851,182 | 11/1974 | Wallace | 363/143 X |
| 4,268,899 | 5/1981 | Rokas | 363/143 X |
| 5,119,283 | 6/1992 | Steigerwald et al. | 363/143 X |

Primary Examiner—Peter S. Wong
Assistant Examiner—Y. J. Han

[57] ABSTRACT

A boost converter, a method of operating the same and a power converter employing the boost converter or the method. In one embodiment, the boost converter includes: (1) a rectifier bridge having first and second input nodes and first and second output nodes, the second input node couplable to a source of AC power, (2) an inductor coupled to the first input node and couplable to the source of AC power, (3) first and second switches, coupled to first and second capacitors of the boost converter and the first and second input nodes, respectively, that are controllable to apply AC power from the source of AC power to the inductor and (4) a contactor, coupled between an intermediate node in the rectifier bridge and the node between the first and second capacitors, that is controllable to achieve alternative open and closed states in which: (4a) in the open state, the first and second switches are coupled in series across the source of AC power and (4b) in the closed state, the first switch is coupled across the source of AC power to reduce an overall loss associated with the first and second switches.

20 Claims, 4 Drawing Sheets

DUAL MODE BOOST CONVERTER AND METHOD OF OPERATION THEREOF

TECHNICAL FIELD OF THE INVENTION

The present invention is directed, in general, to power converters and, more specifically, to a boost converter having at least two alternative modes of operation to improve the efficiency thereof under certain operating conditions and a method of operating such converter to improve its efficiency.

BACKGROUND OF THE INVENTION

A power converter is a power processing circuit that converts an input voltage or current source waveform into a specified output voltage or current waveform. In off-line applications wherein power factor correction, total harmonic distortion (THD) reduction and a stable, regulated voltage are desired, the power converter typically employs a boost converter.

The power converter generally includes an electromagnetic interference (EMI) filter, coupled to a source of alternating current (AC) power. A rectifier bridge, coupling the EMI filter to the boost converter, rectifies the AC power to produce an unregulated DC voltage. The boost converter receives the unregulated DC voltage and generates therefrom a controlled DC voltage. A DC/DC converter, coupled to the boost converter, then converts the high DC voltage (e.g., 400 VDC or 800 VDC) to a lower voltage (e.g., 48 VDC or 24 VDC) for use by a board-mounted power supply (BMP).

A conventional boost converter generally includes an inductor, coupled between an input voltage (e.g., the unregulated DC voltage from the rectifier bridge) and a power switch. The power switch is then coupled in parallel with a rectifying diode and an output capacitor. The output capacitor is usually large to ensure a constant output voltage to a load (e.g., a DC/DC converter). The output voltage (measured at the load) of the boost converter is always greater than the input voltage.

The boost converter operates as follows. When the power switch is conducting, the rectifying diode is reverse-biased, isolating the output capacitor and, therefore, the load. During this period, the input voltage supplies energy to charge the inductor and an inductor current rises. A stored charge in the output capacitor powers the load. When the power switch is not conducting, the inductor current decreases as energy from both the inductor and the input flows forward through the rectifying diode, charging the output capacitor and powering the load. The output voltage of the boost converter can thus be controlled by varying a duty cycle of the power switch.

For high AC input voltages, in conjunction with the output voltage of a boost converter being greater than the input DC voltage, the output of the conventional boost converter may be too high for commonly available semiconductor devices. A so-called "three-level" boost converter that provides two equal output voltages has been suggested to accommodate semiconductor devices rated for approximately half the normal output voltage. The three-level boost converter generally consists of an inductor and two boost converter circuits (each having a power switch, rectifying diode and output capacitor) coupled in series. By dividing the output voltage between two outputs, the three-level boost converter reduces maximum voltage stresses across the semiconductor devices. Separate DC/DC converters may then be used with each output. If two DC/DC converters are used, only half of the output voltage is applied to each DC/DC converter. Switching devices in the DC/DC converters, therefore, can also be rated at half of the output voltage. Alternatively, a single DC/DC converter may be used, as with a conventional boost converter.

For high input voltages, the three-level boost converter allows the use of lower voltage switching devices and a smaller boost inductor, thus providing better performance than the conventional boost converter. For wide input applications, however, the conversion efficiency of the three-level boost converter is quite poor at a low end of the input range, since the input current must flow through multiple switching devices.

Practically, the three-level boost converter is more efficient than the conventional boost converter for high output voltages (e.g., 800 VDC). For single-phase universal input applications (e.g., 85 VAC to 265 VAC), however, the three-level boost becomes less efficient than the conventional boost converter.

Accordingly, what is needed in the art is a boost converter topology that obtains an improved conversion efficiency over a wide input range.

SUMMARY OF THE INVENTION

To address the above-discussed deficiencies of the prior art, the present invention provides a boost converter, a method of operating the same and a power converter employing the boost converter or the method. In one embodiment, the boost converter includes: (1) a rectifier bridge having first and second input nodes and first and second output nodes, the second input node couplable to a source of AC power, (2) an inductor coupled to the first input node and couplable to the source of AC power, (3) first and second switches, coupled to first and second capacitors of the boost converter and the first and second input nodes, respectively, that are controllable to apply AC power from the source of AC power to the inductor and (4) a contactor, coupled between an intermediate node in the rectifier bridge and the node between the first and second capacitors, that is controllable to achieve alternative open and closed states in which: (4a) in the open state, the first and second switches are coupled in series across the source of AC power (4b) in the closed state, the first switch is coupled across the source of AC power to reduce an overall loss associated with the first and second switches.

The present invention therefore introduces a boost converter having switches that are reconfigurable depending upon the state of a contactor. By reconfiguring the switches dynamically during its operation, the boost converter's topology can be modified to improve operating efficiency.

In one embodiment of the present invention, the first and second switches are coupled to a node between serially-coupled first and second capacitors, the first and second capacitors being coupled across the first and second output nodes and cooperating to provide an output voltage of the boost converter. In an embodiment to be illustrated and described, the first and second capacitors are employed to store energy to be provided to the boost converter's output. In one embodiment of the present invention, the boost converter further comprises a converter controller, coupled to the contactor, that maintains the contactor in the open state when a peak voltage of the AC power (the input voltage) is more than half of an output voltage of the boost converter. In a related embodiment, the converter controller maintains the contactor in the closed state when the peak voltage of the AC power is less than half of an output voltage of the boost converter.

In one embodiment of the present invention, the boost converter further comprises a converter controller, coupled to the first and second switches that supplies a common drive signal to the first and second switches. In an alternative embodiment, when the contactor is in the open state, the converter controller is capable of supplying interleaved drive signals to the first and second switches.

In one embodiment of the present invention, the common drive signal is pulse-width modulated (PWM). Of course, the signal may be modulated in another well known manner.

In one embodiment of the present invention, the contactor is further coupled to a second intermediate node in the rectifier bridge, the contactor being controllable such that, in the closed state, the first and second switches are coupled in parallel across the source of AC power to allow the first and second switches to share a current of the AC power. In one embodiment to be illustrated and described, the contactor makes or breaks a greater number of connections to allow the first and second switches to be repositioned between alternative series and parallel configurations.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Prior to describing the illustrated embodiments of the present invention, a solution that improves upon deficiencies of the prior art, but still exhibits some limitations, will initially be described. One way to increase a conversion efficiency of a three-level boost converter is to reduce the number of switching devices in a current path. An AC-side switching single-phase three-level boost converter reduces diode conduction losses by coupling an inductor directly to an AC input. A rectifier bridge is coupled to the inductor to rectify the AC input voltage. Output capacitors are coupled across an output of the rectifier bridge to provide power to one or more DC/DC converters. Power switches are then coupled between the output capacitors and an input of the rectifier bridge. Though this topology reduces diode conduction losses, the power switches are still in series when conducting. Conduction losses are, therefore, still high at a low input voltage.

Figure 1:
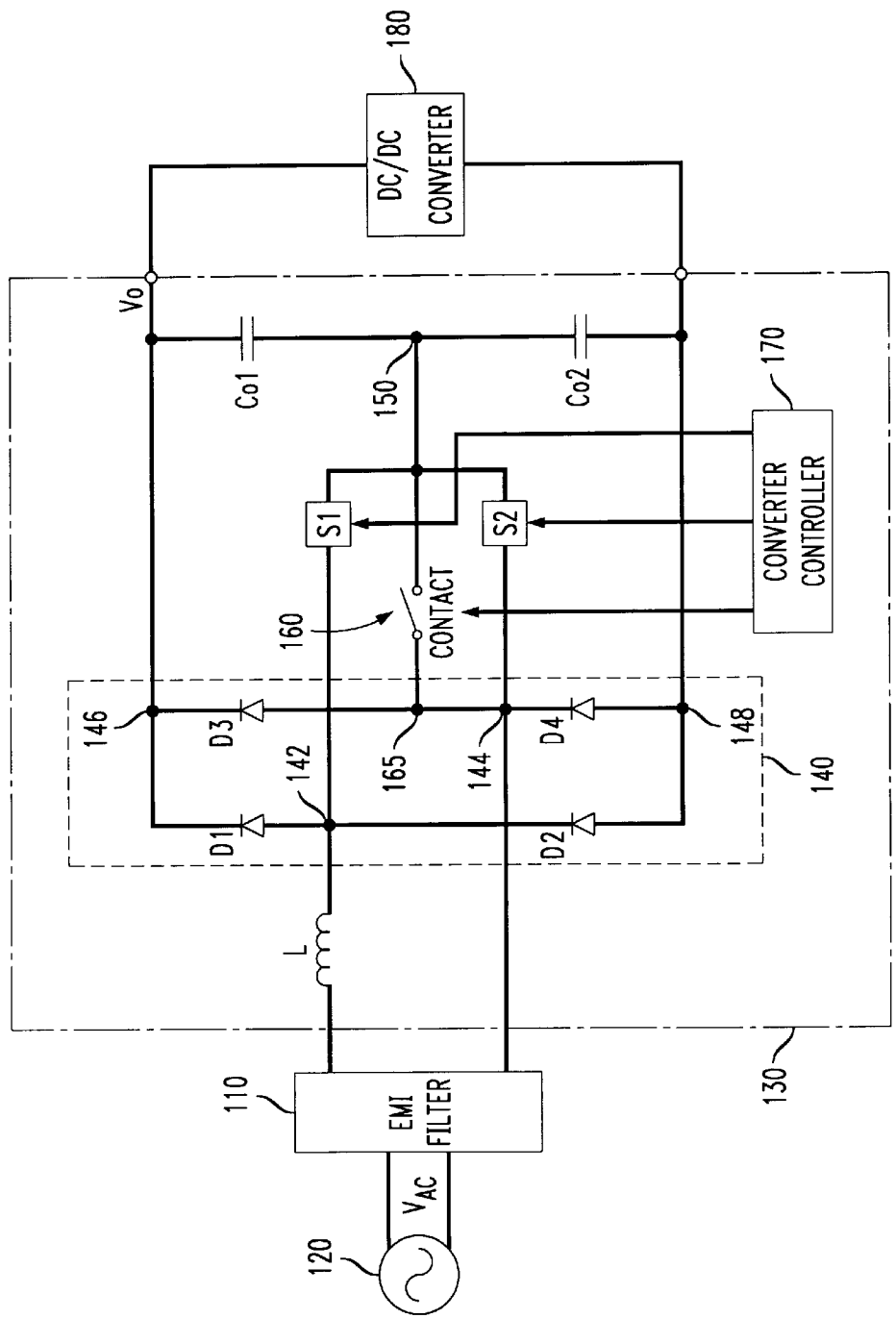
FIG. 1 illustrates a schematic diagram of an embodiment of a power converter constructed according to the principles of the present invention.

Turning now to FIG. 1, illustrated is a schematic diagram of an embodiment of a power converter 100 constructed according to the principles of the present invention. The power converter 100 includes an EMI filter 110 coupled to a source of AC power 120 having an input voltage Vac. The power converter 100 further includes a high efficiency AC input three-level boost converter 130, coupled to the EMI filter 110. The boost converter 130 rectifies the AC power and generates therefrom regulated DC power at a high output voltage Vo (e.g., 400 VDC or 800 VDC). The power converter 100 further includes a DC/DC converter 180, coupled to the boost converter 130, that converts the regulated DC power to DC power of a lower voltage (e.g., 48 VDC or 24 VDC).

The boost converter 130 includes a rectifier bridge 140 having first and second input nodes 142, 144 and first and second output nodes 146, 148. The second input node 144 of the rectifier bridge 140 is coupled to the EMI filter 110. In the illustrated embodiment, the rectifier bridge 140 consists of (preferably fast recovery) rectifying diodes D1, D2, D3, D4 to minimize reverse recovery losses. Those skilled in the art should realize that other types of rectifying devices may also be used to form the rectifier bridge 140.

The boost converter 130 further includes an inductor L coupled between the EMI filter 110 and the first input node 142 of the rectifier bridge 140. The boost converter 130 further includes serially-coupled first and second capacitors Co1, Co2, coupled across the first and second output nodes 146, 148 of the rectifier bridge 140. Since the first and second capacitors Co1, Co2 have substantially the same output voltage, the first and second capacitors Co1, Co2 may cooperate to provide the output voltage Vo of the boost converter 130 to the DC/DC converter 180. Of course, each of the first and second capacitors Co1, Co2 may provide power to separate DC/DC converters. The boost converter 130 further includes first and second switches S1, S2 coupled to a node 150 between the first and second capacitors Co1, Co2 and the first and second input nodes 142, 144 of the rectifier bridge 140, respectively. The boost converter 130 further includes a contactor 160, coupled between an intermediate node 165 in the rectifier bridge 140 and the node 150 between the first and second capacitors Co1, Co2. The boost converter 130 still further includes a converter controller 170, coupled to the contactor 160 and the first and second switches S1, S2. The converter controller 170 switches the first and second switches S1, S2 to apply AC power from the source of AC power 120 to the inductor L. The converter controller 170 thus operates the boost converter 130 to provide regulated DC power from the AC power.

For high input voltages Vac, when a peak of the input voltage Vac of the AC power is more than half of the output voltage Vo, the converter controller 170 maintains the contactor 160 in an open state. The first and second switches S1, S2 are placed in a series-coupled configuration across the EMI filter 110. Two methods of operation are available in this configuration. The first and second switches S1, S2 may be driven either by a common drive signal or by interleaved drive signals from the converter controller 170. In one embodiment, the drive signals may be pulse-width modulated (PWM) signals. Of course, other modulation schemes may also be used.

If the converter controller 170 supplies a common drive signal to both the first and second switches S1, S2, the boost converter 130 functions as a conventional boost converter. The first and second switches S1, S2 conduct for a period, applying the input voltage Vac to the inductor L and raising an inductor current. During this period, a stored charge in the first and second capacitors Co1, Co2 provides DC power to the DC/DC converter 180. The first and second switches S1, S2 then turn off. A voltage difference between the output voltage Vo and the input voltage Vac is applied to the inductor L, lowering the inductor current. Energy from the inductor L and the input voltage Vac charges the first and second capacitors Co1, Co2 and provides DC power to the DC/DC converter 180.

Alternatively, the converter controller 170 may supply interleaved drive signals to the first and second switches S1, S2. In one embodiment, the drive signals may be interleaved by 180°. Of course, other interleaving schemes may also be used. When an instantaneous input voltage is less than half of the output voltage Vo, a duty ratio of the drive signals is greater than 0.5. Both the first and second switches S1, S2 conduct to apply the input voltage Vac to the inductor L, thereby raising the inductor current. The first switch S1, for instance, then turns off. A voltage difference between half of the output voltage Vo and the input voltage Vac is applied to the inductor L to decrease the inductor current. When the instantaneous input voltage is greater than half of the output voltage Vo, the duty-ratio of the drive signals is less than 0.5. The conduction of, for instance, the first switch S1 then applies a voltage difference between the input voltage Vac and half of the output voltage Vo to the inductor L to raise the inductor current. When the first switch S1 turns off, a voltage difference between the output voltage Vo and the input voltage Vac is applied to the inductor thereby lowering the inductor current.

Figure 2:
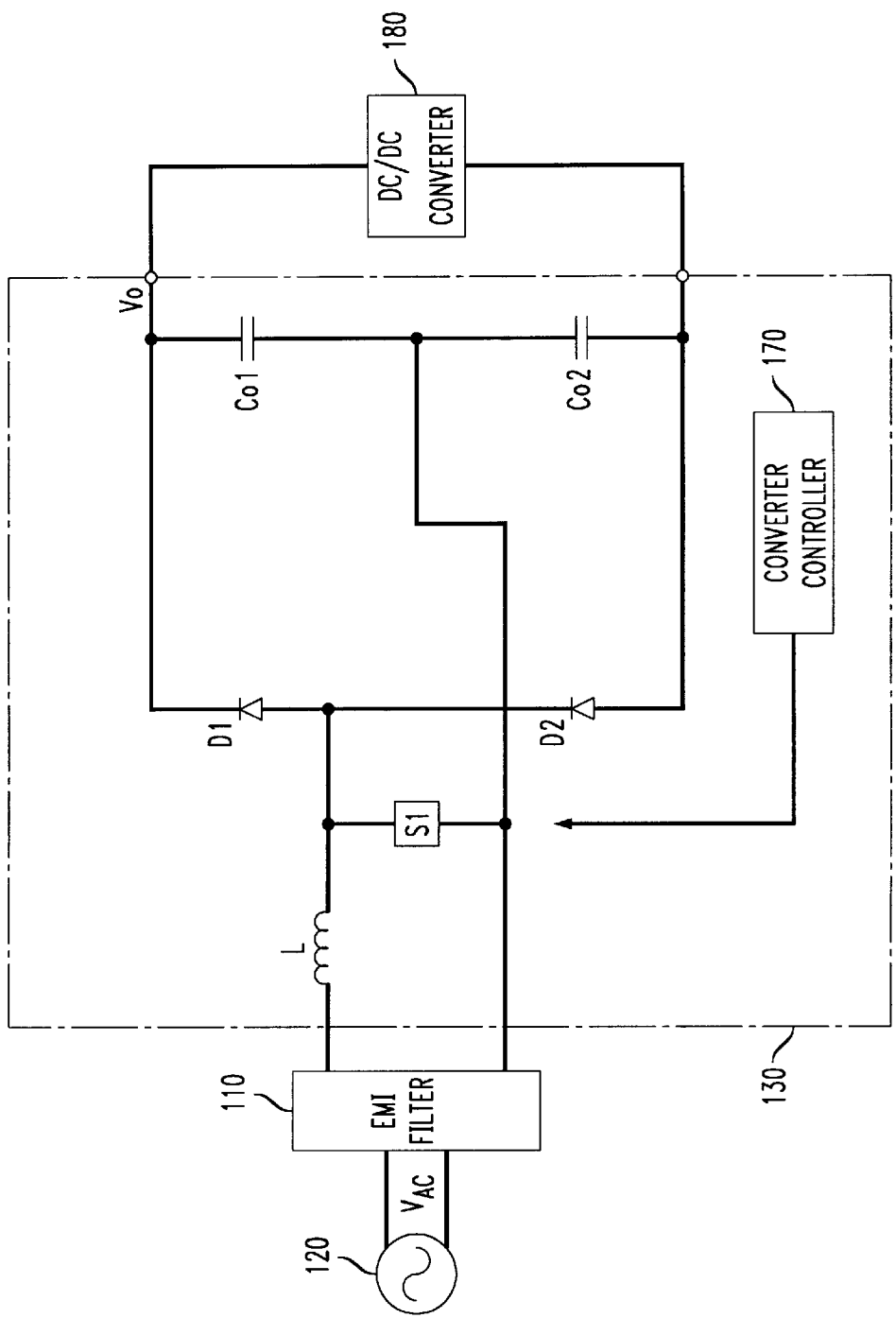
FIG. 2 illustrates a simplified schematic diagram of the power converter of FIG. 1 at low input voltages.

Turning now to FIG. 2 and with continuing reference to FIG. 1, illustrated is a simplified schematic diagram of the power converter 100 of FIG. 1 at low input voltages. Low input voltages Vac may exist when a peak of the input voltage Vac of the AC power is less than half of the output voltage Vo. Since both the first and second switches S1, S2 are rated for half the output voltage Vo, the second switch S2 is not required at low input voltages Vac and may be removed. While the illustrated embodiment removes the second switch S2 at low input voltages, those skilled in the art should realize that, alternatively, the first switch S1 may be removed. The converter controller 170 therefore places the contactor 160 in a closed state wherein the first switch S1 is coupled across the source of AC power 120 and the second switch S2 is shorted out. Since the second switch S2 is shorted out and therefore does not operate under low input, high current conditions, the second switch S2 may be sized for only low current operation. In the illustrated embodiment, only the first switch S1 need operate with high currents.

When the first switch S1 is conducting, the current flows through only the first switch S1, instead of both the first and second switches S1, S2. An overall loss associated with the first and second switches S1, S2 is thus reduced. When the first switch S1 is open, the current flows alternately through either the first or second rectifying diode D1, D2 to charge the first or second output capacitor Co1, Co2, respectively. Each output capacitor participates in the boost operation every other half line cycle.

Figure 3:
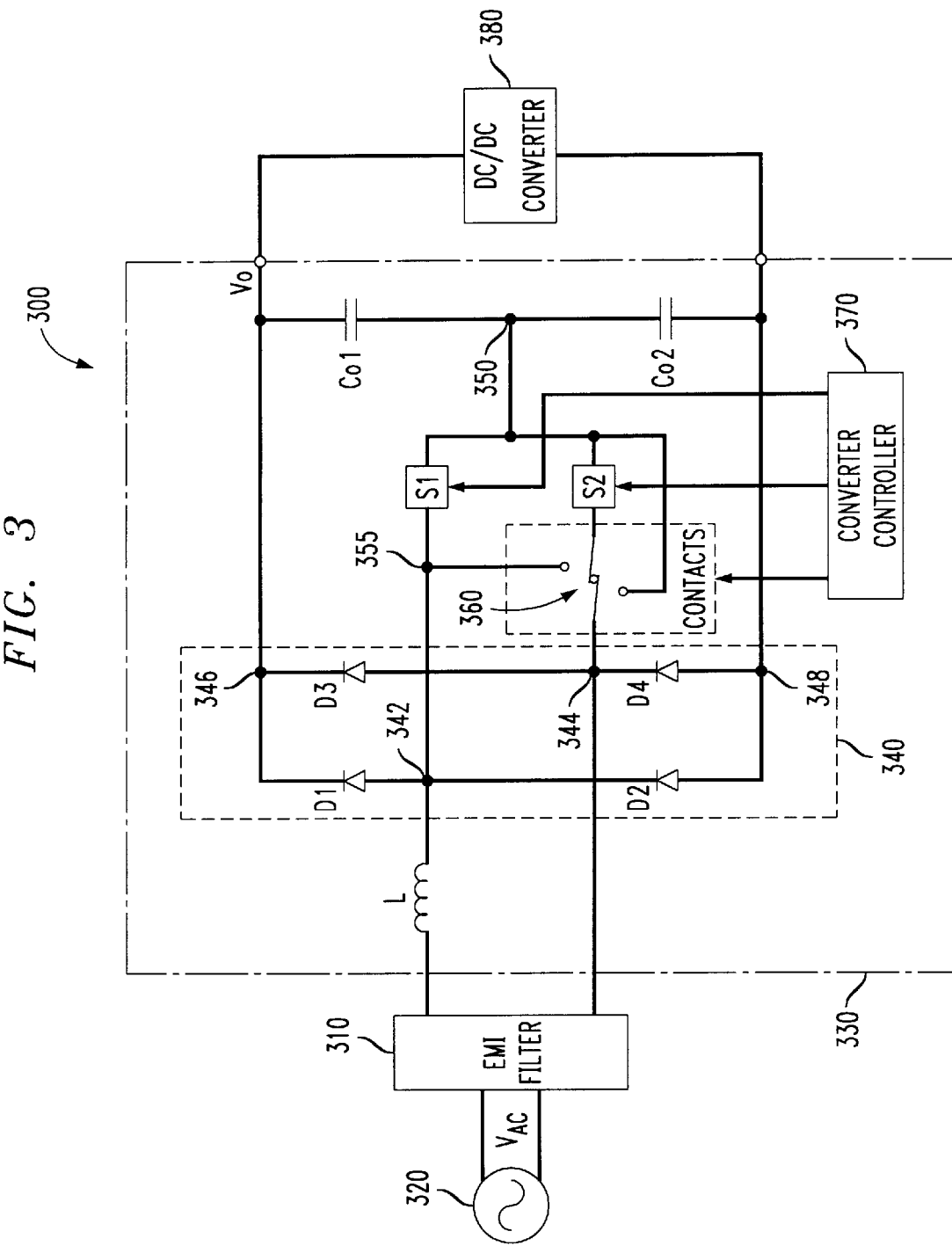
FIG. 3 illustrates a schematic diagram of another embodiment of a power converter constructed according to the principles of the present invention.

Turning now to FIG. 3, illustrated is a schematic diagram of another embodiment of a power converter 300 constructed according to the principles of the present invention. The power converter 300 includes an EMI filter 310 coupled to a source of AC power 320 having an input voltage Vac.

The power converter 300 further includes a high efficiency AC input three-level boost converter 330, coupled to the EMI filter 310. The boost converter 330 rectifies the AC power and generates therefrom regulated DC power at a high output voltage Vo (e.g., 400 VDC or 800 VDC). The power converter 300 further includes a DC/DC converter 380, coupled to the boost converter 330, that converts the regulated DC power to DC power of a lower voltage (e.g., 48 VDC or 24 VDC).

The boost converter 330 includes a rectifier bridge 340, consisting of rectifying diodes D1, D2, D3, D4, and having first and second input nodes 342, 344 and first and second output nodes 346, 348. The second input node 344 is coupled to the EMI filter 310. The boost converter 330 further includes an inductor L coupled between the EMI filter 310 and the first input node 342. The boost converter 330 further includes serially-coupled first and second capacitors Co1, Co2, coupled across the first and second output nodes 346, 348. The first and second capacitors Co1, Co2 cooperate to provide the output voltage Vo of the boost converter 330 to the DC/DC converter 380.

The boost converter 330 further includes first and second switches S1, S2 coupled to a node 350 between the first and second capacitors Co1, Co2 and the first and second input nodes 342, 344, respectively. In the illustrated embodiment of the present invention, the first and second switches S1, S2 are metal-oxide semiconductor field-effect transistors (MOSFETs). Of course, other types of switches may also be used.

The boost converter 330 further includes a contactor 360, coupled between an intermediate node in the rectifier bridge 340 and the node 350 between the first and second capacitors Co1, Co2. In the illustrated embodiment, the intermediate node is equivalent to the second input node 344. "Contactor," for purposes of the present invention, is broadly defined as anything capable of establishing a conductive path from one location to another. "Contactor" therefore includes a wide array of devices, such as solid state switches (such as transistors), relays, jumpers, wires, soldered connections and the like. The contactor of the illustrated embodiment is most typically called upon to transition between conductive and nonconductive states only occasionally, making or breaking a conductive path relatively infrequently.

The contactor 360 is further coupled to a second intermediate node 355 in the rectifier bridge 340. In the illustrated embodiment, the second intermediate node 355 is equivalent to the first input node 342. The boost converter 330 still further includes a converter controller 370, coupled to the first and second switches S1, S2 and the contactor 360.

The operation of the boost converter 300 is analogous to the operation of the boost converter 130 of FIG. 1 and will not be discussed in detail.

Figure 4:
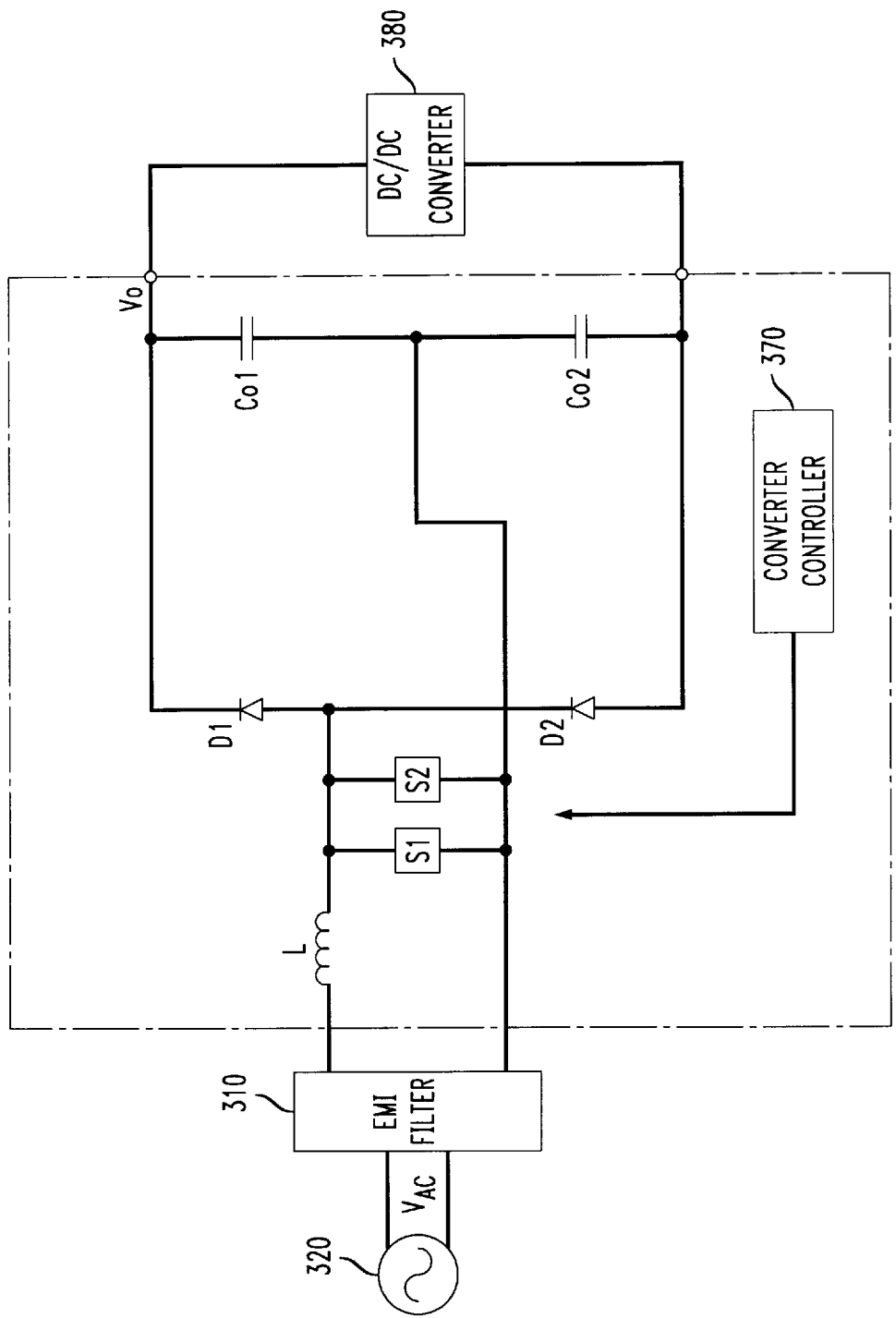
FIG. 4 illustrates a simplified schematic diagram of the power converter of FIG. 3 at low input voltages.

Turning now to FIG. 4 and with continuing reference to FIG. 3, illustrated is a simplified schematic diagram of the power converter 300 of FIG. 3 at low input voltages. Since the boost converter 330 contains MOSFETs, it may be desirable, under low input voltage conditions, to use the second switch S2 instead of shorting it out. Under low input voltage conditions therefore, the converter controller 370 switches the contactor 360 to configure the first and second switches S1, S2 in parallel across the source of AC power 320. The first and second switches S1, S2 may thus share a current of the AC power. Conduction losses are reduced since there are now two switches to carry current. Under high input voltage conditions, however, both the first and second switches S1, S2 are required. The converter controller 370, therefore, switches the contactor 360 to place the second switch S2 in series with the first switch S1.

By changing a configuration of the boost converter 330, the contactor 360 improves the efficiency of the three-level boost converter and achieves an even higher efficiency than the conventional boost converter for single-phase universal input voltages. The boost converter 330 may thus be constructed from switching devices rated at half of the output voltage Vo. A smaller inductor may also be used, decreasing inductive losses. Since only half of the output voltage Vo is used to run the boost converter 300, a boost switch duty-cycle may be further reduced, resulting in a corresponding reduction in conduction losses. Further, due to a lower PWM voltage amplitude, the switching losses are reduced.

Those skilled in the art should understand that the previously described embodiments of the boost converter (and applications employed therewith) are submitted for illustrative purposes only and other embodiments capable of providing dynamic reconfiguration to improve operating efficiency are well within the broad scope of the present invention. For a better understanding of power electronics, including power rectifiers and boost converters, see *Power Electronics: Converters, Applications and Design*, by N. Mohan, T. M. Undeland and W. P. Robbins, John Wiley & Sons Publishing Company (1989), incorporated herein by reference.

Although the present invention has been described in detail, those skilled in the art should understand that they can make various changes, substitutions and alterations herein without departing from the spirit and scope of the invention in its broadest form.

What is claimed is:

1. A boost converter, comprising:
   a rectifier bridge having first and second input nodes and first and second output nodes, said second input node couplable to a source of AC power;
   an inductor coupled to said first input node and couplable to said source of AC power;
   first and second switches, coupled to first and second capacitors of said boost converter and said first and second input nodes, respectively, that are controllable to apply AC power from said source of AC power to said inductor; and
   a contactor, coupled between an intermediate node in said rectifier bridge and said node between said first and second capacitors, that is controllable to achieve alternative open and closed states in which:
      in said open state, said first and second switches are coupled in series across said source of AC power, and
      in said closed state, said first switch is coupled across said source of AC power to reduce an overall loss associated with said first and second switches.

2. The boost converter as recited in claim 1 wherein said first and second switches are coupled to a node between serially-coupled first and second capacitors, said first and second capacitors being coupled across said first and second output nodes and cooperating to provide an output voltage of said boost converter.

3. The boost converter as recited in claim 1 further comprising a converter controller, coupled to said contactor, that maintains said contactor in said open state when a peak voltage of said AC power is more than half of an output voltage of said boost converter.

4. The boost converter as recited in claim 1 further comprising a converter controller, coupled to said first and second switches that supplies a common drive signal to said first and second switches.

5. The boost converter as recited in claim 4 wherein, when said contactor is in said open state, said converter controller is capable of supplying interleaved drive signals to said first and second switches.

6. The boost converter as recited in claim 4 wherein said common drive signal is pulse-width modulated (PWM).

7. The boost converter as recited in claim 1 wherein said contactor is further coupled to a second intermediate node in said rectifier bridge, said contactor being controllable such that:
   in said closed state, said first and second switches are coupled in parallel across said source of AC power to allow said first and second switches to share a current of said AC power.

8. A method of operating a boost converter including a rectifier bridge having first and second input nodes and first and second output nodes, said second input node couplable to a source of AC power, an inductor coupled to said first input node and couplable to said source of AC power and first and second switches, coupled to first and second capacitors of said boost converter and said first and second input nodes, respectively, that are controllable to apply AC power from said source of AC power to said inductor, said method comprising the steps of:
   opening a contactor, coupled between an intermediate node in said rectifier bridge and said node between said first and second capacitors, to couple said first and second switches in series across said source of AC power; and
   closing said contactor to couple said first switch across said source of AC power to reduce an overall loss associated with said first and second switches.

9. The method as recited in claim 8 wherein said first and second switches are coupled to a node between serially-coupled first and second capacitors, said first and second capacitors coupled across said first and second output nodes, said method comprising the step of providing an output voltage of said boost converter with said first and second capacitors.

10. The method as recited in claim 8 further comprising the step of maintaining said contactor in said open state when a peak voltage of said AC power is more than half of an output voltage of said boost converter.

11. The method as recited in claim 8 further comprising the step of supplying a common drive signal to said first and second switches.

12. The method as recited in claim 11 further comprising the step of supplying interleaved drive signals to said first and second switches when said contactor is in said open state.

13. The method as recited in claim 11 further comprising the step of pulse-width modulating said common drive signal.

14. The method as recited in claim 8 wherein said step of closing comprises the step of coupling said first and second switches in parallel across said source of AC power to allow said first and second switches to share a current of said AC power.

15. A power converter, comprising:
   an electromagnetic interference (EMI) filter coupled to a source of AC power;
   a boost converter, including:
      a rectifier bridge having first and second input nodes and first and second output nodes, said second input node couplable to said EMI filter, an inductor coupled to said first input node and couplable to said EMI filter, serially-coupled first and second capacitors, coupled across said first and second output nodes, that cooperate to provide an output voltage of said boost converter, first and second switches, coupled to a node between said first and second capacitors and said first and second input nodes, respectively, that are controllable to apply AC power from said source of AC power to said inductor, a contactor, couplable between an intermediate node in said rectifier bridge and said node between said first and second capacitors, that is controllable to achieve alternative open and closed states in which:
   in said open state, said first and second switches are coupled in series across said EMI filter, and
   in said closed state, said first switch is coupled across said source of AC power to reduce an overall loss associated with said first and second switches, and a converter controller, coupled to said first and second switches and said contactor, that operate said boost converter to provide regulated DC power from said AC power; and a DC/DC converter, coupled to said boost converter, that converts said regulated DC power to DC power of a lower voltage.

16. The power converter as recited in claim 15 wherein said converter controller maintains said contactor in said open state when a peak voltage of said AC power is more than half of said output voltage and closed state when said peak voltage of said AC power is less than half of said output voltage.

17. The power converter as recited in claim 15 wherein said converter controller supplies a common drive signal to said first and second switches.

18. The power converter as recited in claim 15 wherein, when said contactor is in said open state, said converter controller is capable of supplying interleaved drive signals to said first and second switches.

19. The power converter as recited in claim 17 wherein said common drive signal is pulse-width modulated (PWM).

20. The power converter as recited in claim 15 wherein said contactor is further coupled to a second intermediate node in said rectifier bridge, said contactor being controllable such that:
   in said closed state, said first and second switches are coupled in parallel across said source of AC power to allow said first and second switches to share a current of said AC power.

* * * * *